Oct. 7, 1969 W. H. ZUERCHER 3,470,998
SLOWDOWN MEANS FOR LONGITUDINAL MOVEMENT TO LATERAL MOVEMENT
Filed July 14, 1966 4 Sheets-Sheet 1

INVENTOR
Warren H. Zuercher

BY JW Secrest
ATTORNEY

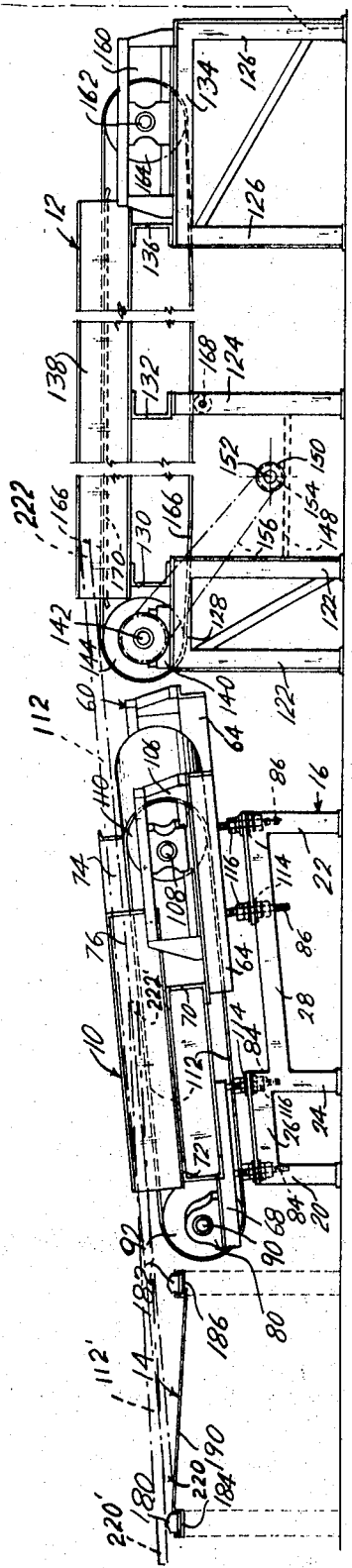

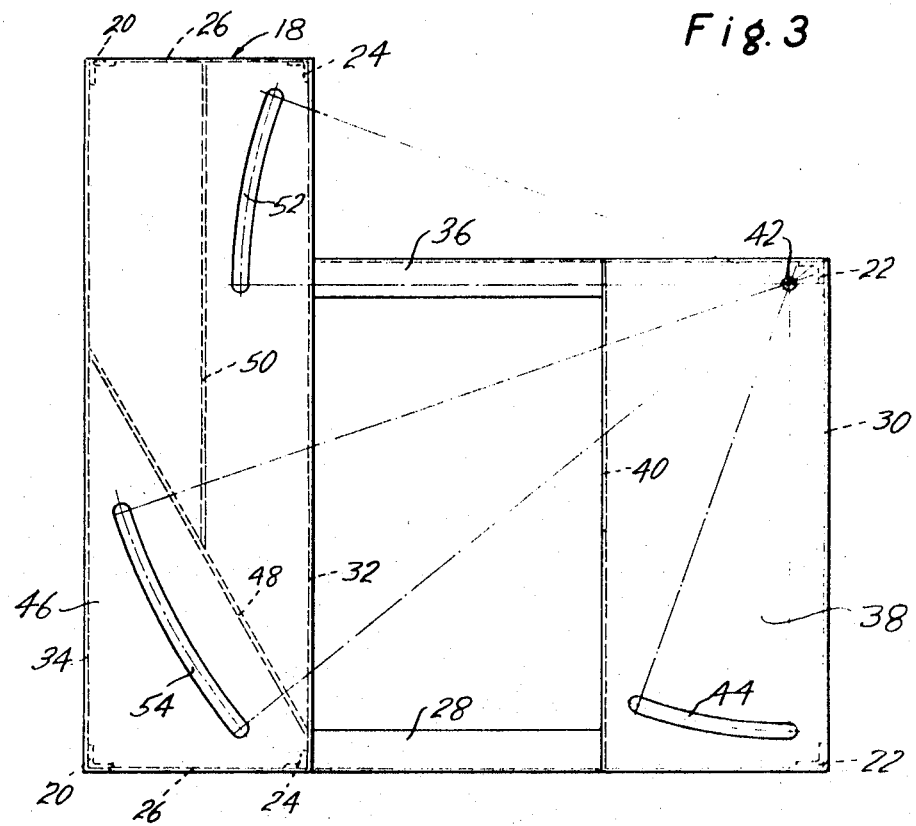
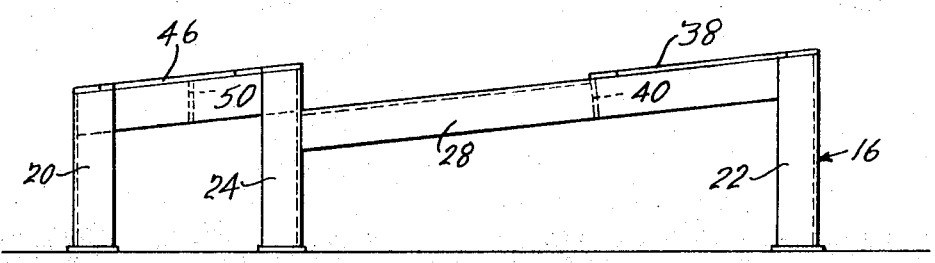

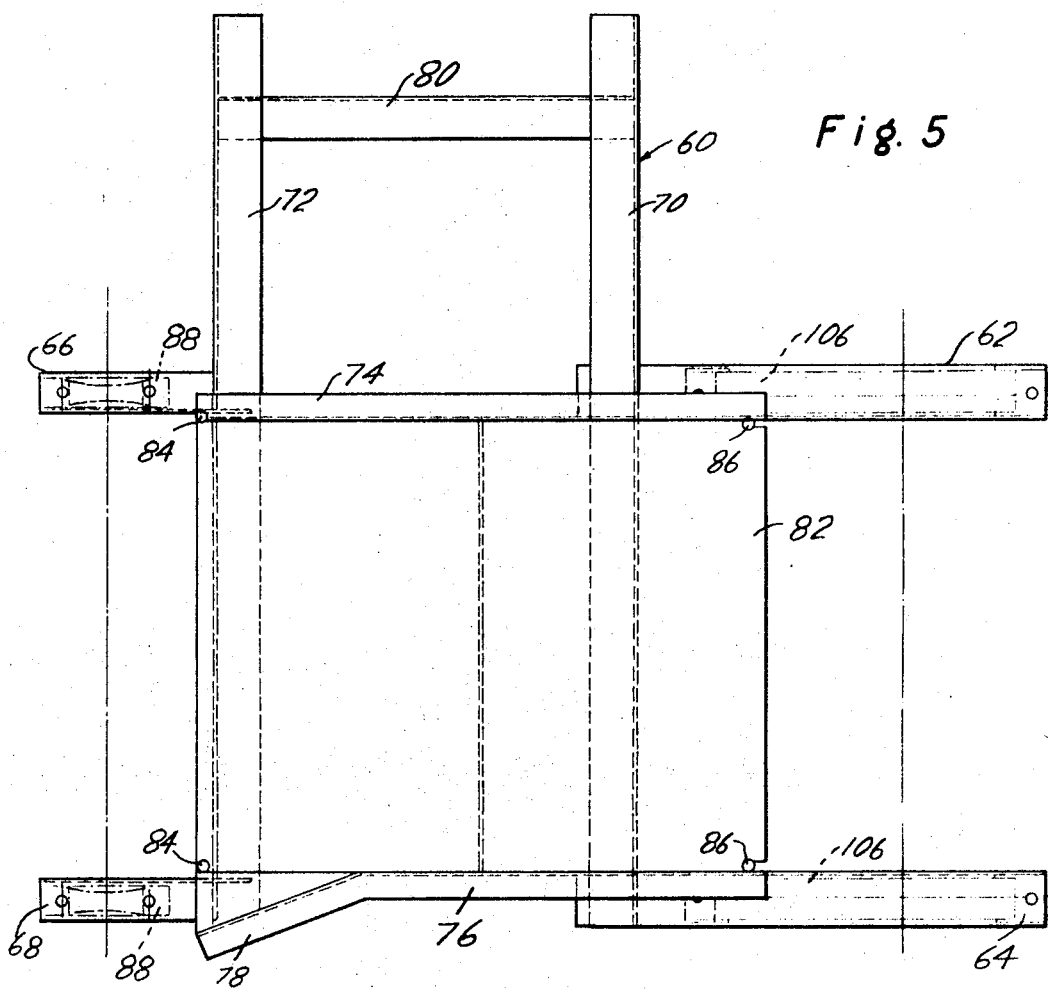
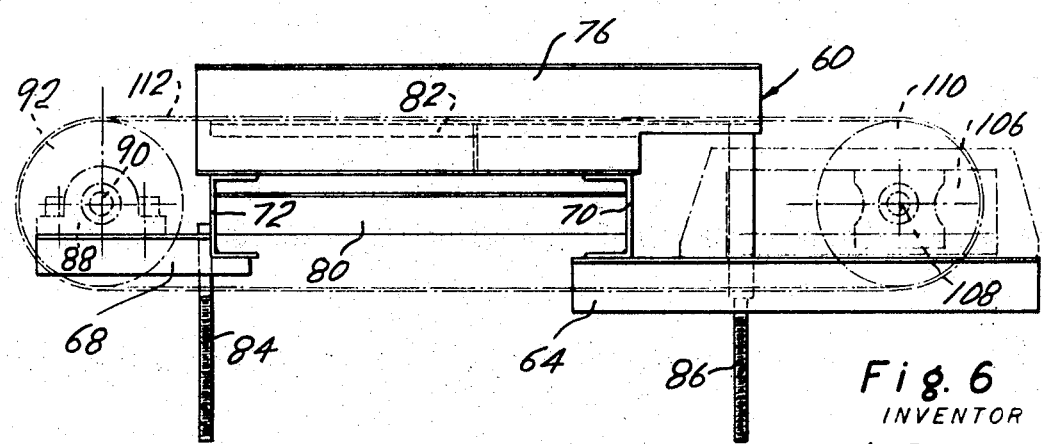

United States Patent Office 3,470,998
Patented Oct. 7, 1969

3,470,998
SLOWDOWN MEANS FOR LONGITUDINAL MOVEMENT TO LATERAL MOVEMENT
Warren H. Zuercher, Seattle, Wash., assignor to Stetson-Ross Machine Company, Inc., Seattle, Wash., a corporation of Washington
Filed July 14, 1966, Ser. No. 565,124
Int. Cl. B65g 47/24, 37/00
U.S. Cl. 198—33                                  10 Claims

ABSTRACT OF THE DISCLOSURE

This device changes the longitudinal movement of lumber on a high speed infeed conveyor to transverse movement on a discharge conveyor wherein the latter is transversely positioned relative to the infeed conveyor. A laterally swinging slowdown conveyor transfers the lumber from the infeed conveyor to the discharge conveyor, see FIGURE 1.

---

In a sawmill it is necessary to change the movement of lumber from a longitudinal movement to a transverse movement. For example, the longitudinal conveyor belt from a high-speed planer may travel at a velocity up to 1000 feet per minute. In order to do further processing and work on the piece of lumber, it is necessary to change the longitudinal movement of a piece of lumber to a transverse movement. It is readily apparent that, if the velocity is up to 1000 feet per minute, it is not practical to suddenly change the longitudinal movement of the lumber to a transverse movement without possibly damaging the lumber. Therefore, in view of this necessity, I have invented this method and apparatus for moving a piece of lumber in a longitudinal manner to moving in a transverse manner. Accordingly, it is an object of this invention to provide a method and apparatus for changing the movement of an object from a longitudinal movement to a transverse movement; to provide a method and apparatus for making a consistent lumber line which moves in a transverse manner; to provide a method and apparatus which straightens out a piece of lumber for transverse movements; to provide a method and apparatus which straightens out a piece of lumber so that one piece of lumber is not on top of another piece of lumber; to provide a method and apparatus which can be readily used with a variable speed longitudinal conveyor; to provide a method and apparatus for making a smooth transition from a longitudinal movement to a transverse movement; and, to provide slowdown means which may be used at various angles, heights and inclinations with respect to the longitudinal conveyor. These and other important objects and advantages of the invention will be more particularly brought forth with reference to the accompanying drawings, the detailed specification of the invention and the appended claims.

In the drawings:

FIGURE 2 is a side elevational view of the apparatus for slowing down the longitudinal movement of the lumber and illustrates this apparatus as taking lumber from the first longitudinal conveyor and transferring it to a third transverse conveyor;

FIGURE 3 is a plan view looking down on a portion of the slowdown apparatus and shows the pivot area and the guides on the bases that slow down the apparatus;

FIGURE 4 is a fragmentary side elevational view of the slowdown apparatus and illustrates the base;

FIGURE 5 is a plan view looking down on the rotating table of the slowdown apparatus; and FIGURE 6 is a fragmentary side elevational view of the rotating table of the slowdown apparatus.

Figure 1:
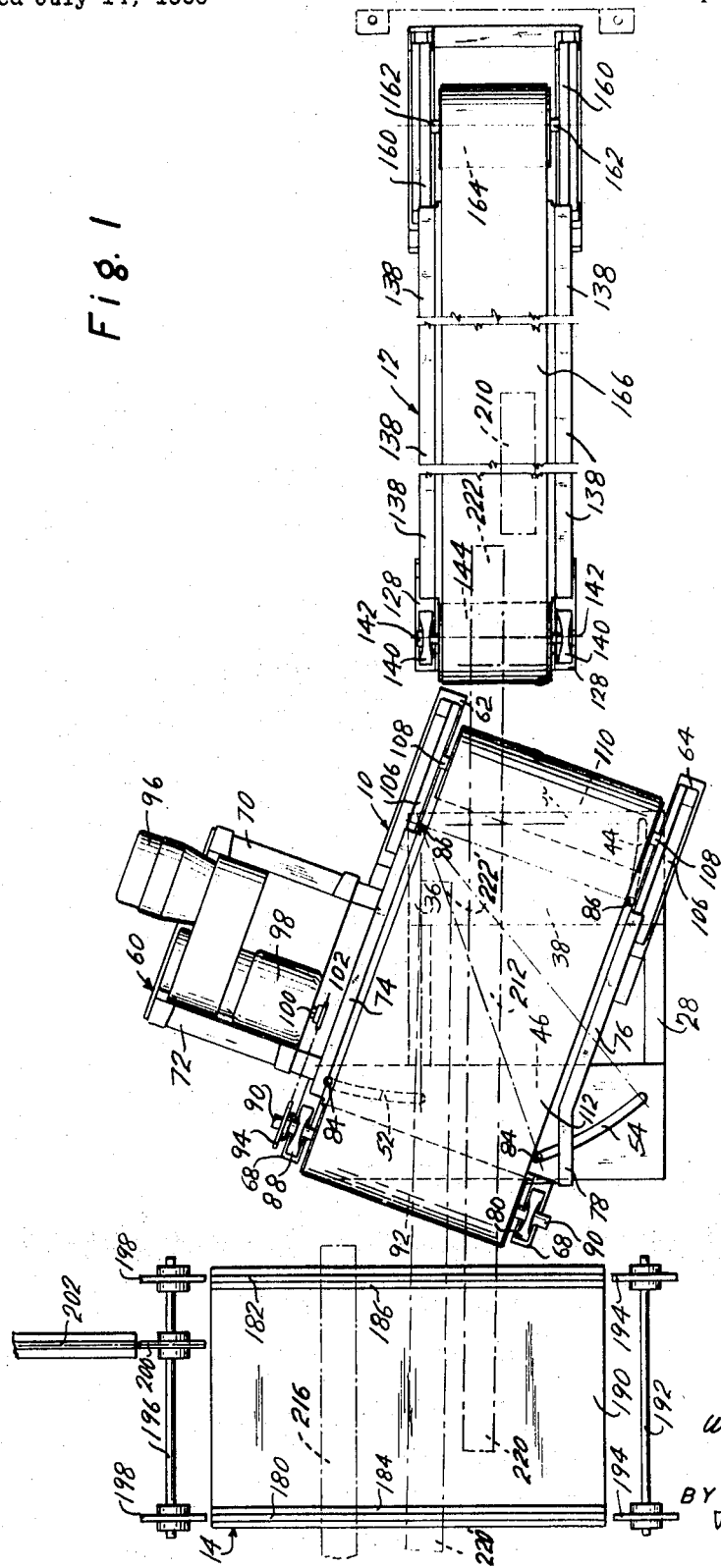
FIGURE 1 is a plan view of the apparatus which is used to slow down the longitudinal movement of the piece of lumber prior to transferring it to transfer chains for transverse movement and which apparatus is used in conjunction with the first conveyor or a first longitudinal conveyor and in conjunction with a third conveyor or a third transverse conveyor.

In FIGURES 1 and 2 there is illustrated the slowdown apparatus 10, which may be referred to as the second longitudinal conveyor. Also, there is illustrated a first longitudinal conveyor 12 and a third transverse conveyor 14.

The slowdown apparatus or second longitudinal conveyor 10 comprises a base 16 and a rotating table 18.

The base 16 comprises an exterior leg 20, an exterior leg 22 and an interior leg 24. The interior leg 24 is positioned more closely to the exterior leg 20 than to the exterior leg 22. Actually, there are two sets of exterior legs 20, two sets of interior legs 24 and two sets of exterior legs 22. The upper portions of the exterior leg 20 and the interior leg 24 are connected by a rail 26. The rail 26 slopes downwardly from the leg 24 to the leg 20. The upper part of the leg 24, not at the top of the leg 24, connects with the upper part of the leg 22 by means of a rail 28. The rail 28 slopes downwardly from the leg 22 to the leg 24. The upper part of legs 22, the legs 24 and the legs 20 are substantially at the same elevation.

The upper parts of the legs 22 are connected by a rail 30. The upper parts of the legs 24 are connected by rail 32. The upper parts of the legs 20 are connected by a rail 34. It is seen in FIGURE 3 that the rails 32 and 34 are longer than the rail 30 and that the legs 20—20 and the legs 24—24 are spaced farther apart than the legs 22—22. The leg 22, which may be considered an interior leg 22, connects with the rail 32 by means of a rail 36.

The top part of the legs 22, the rails 28 and 36 are covered and connected by a plate 38. The lower part of the plate 38 has attached thereto transverse rail 40 for stiffening and bracing purposes. In FIGURE 3 it is seen that in the upper right-hand corner there is a passageway 42 which may be considered to be a pivot area.

In the lower portion of the plate 38, there is cut an arcuate guide 44 which is on a radius with respect to the passageway 42. The plate 38 slopes downwardly as do the rails 28 and 36.

The upper part of the legs 20 and 24, and the upper part of the rails 26, 32, and 34 are connected and covered by a plate 46. On the underneath part of this plate 46 there is a diagonal brace 48 and, also, a longitudinal brace 50. The diagonal brace 48 connects with the upper part of the leg 24, the rail 32 and the rail 34. The longitudinal brace 50 connects with the rail 26 and the diagonal rail 48.

In the upper right portion of the plate 46 there is a guide or slot 52 and in the lower left portion of the plate 46 there is a guide or slot 54. The guides 52 and 54 are on a radius with respect to the passageway 42 or pivot area.

In FIGURES 5 and 6 there is illustrated the rotating table 18. The rotating table 18 comprises two spaced-apart longitudinally directed members 62 and 64 and also two spaced-apart longitudinally directed members 66 and 68. The two members 62 and 64 are connected by a U-channel member 70. The two members 66 and 68 are connected by a U-channel member 72. It is seen that the U-channel member 70 is positioned above the members 62 and 64 and may be attached to them by welding. Further, it is seen that the U-channel member 72 is positioned above the members 66 and 68 and may be attached to them by welding. The U-channel members 70 and 72 are connected by two spaced-apart longitudinal members 74 and 76. The members 74 and 76 are positioned above the transverse members 70 and 72 and may be welded to these members. It is seen that the member 76 bends outwardly at 78. The members 70 and 72 are connected by a bracing bar 80. The longitudinal members 74 and 76 are connected by a plate 82. Also, attached to the longitudinal members 66 and 68 and the transverse members 72 and 70 are two spaced-apart threaded studs 84. Attached to approximately the middle and inside surfaces of the longitudinal members 62 and 64 are two threaded and spaced-apart studs 86.

There are positioned on the longitudinal members 66 and 68 pillow blocks 88. These pillow blocks journal head shaft 90. The head shaft 90 carries a roll 92. On the end of the shaft 90 and near the longitudinal member 72 there is attached a sprocket 94.

There is positioned on the transverse members 70 and 72 a motor 96 and a gearbox 98. The motor 96 and the gearbox 98 may be considered to be a combination of unitary construction. The gearbox 98 has an output shaft 100. On the output shaft 100 there is positioned a sprocket 102. The sprocket 102 and the sprocket 94 are connected by a chain 104. The output shaft 100 is in driving relationship with the head shaft 90.

On the longitudinal members 62 and 64 there are positioned bearings 106. These bearings journal a shaft 108. On the shaft 108 there is a roll 110. A conveyor belt 112 passes around the rolls 110 and 92. The conveyor belt 112 may be considered to be an endless belt. It is to be realized that the bearings 106 are adjustable so that it is possible to adjust the spacing between the bearings 88 and the bearings 106 so as to adjust the tension on the endless conveyor belt 112.

In FIGURES 1 and 2 it is seen that the rotating table 18 is positioned on the support 16 with the threaded studs 84 positioned in the guides 52 and 54 and with the threaded stud 86 positioned in the passageway 42 and the guide 44. There are used washers 114 and nuts 116 to securely position the rotating table 18 on the support base 16.

In FIGURE 2 it is seen that there is a high-speed conveyor 120 having on its left end support legs 122, center support legs 124 and on the right end support legs 126.

The upper end of the legs 122 are connected by a longitudinal member 128. On the longitudinal member 128 there is a transverse U-channel member 130. On the upper end of the leg 124 there is a transverse U-channel member 132. The upper ends of the legs 126 are connected by a longitudinal member 134. On the upper part of the longitudinal member 134 there is a transverse U-channel member 136. There is supported on the U-channel members 130, 132 and 136 two spaced-apart longitudinal U-channel members 138.

On the longitudinal members 138 there are positioned two spaced-apart pillow blocks 140. These pillow blocks 140 carry a shaft 142. On the shaft 142 there is positioned a roll 144. On the shaft 142 there is positioned a sprocket 146. Between the legs 124 and 122 there are bracing bars 148. Positioned on the bracing bars 148 is a motor 150. The motor 150 has an output shaft 152. On the output shaft 152 there is a sprocket 154. A chain 156 connects the sprocket 154 and the sprocket 146. The sprocket 154 is in driving relationship with the sprocket 146.

On the member 134 there are two spaced-apart take-up bearings 160. The bearings 160 journal a shaft 162. On the shaft 162 there is a roll 164.

An endless belt 166 runs around the rolls 164 and 144. It is seen that between the center support legs 124 that there is a roll 168. The roll 168 supports the endless belt 166.

Further, it is seen that between the spaced-apart U-channel members 138 that there is a plate 170. This plate supports the endless belt 166. In other words, the upper part of the endless belt 166 is supported by the plate 170 and the lower part is supported by the roll 168 so that the belt does not sag.

There is a third conveyor or a transverse conveyor 14 which moves the lumber in a transverse manner. The third conveyor 14 comprises a left U-channel member 184 and a right U-channel member 186. The left U-channel member 184 carries a transfer chain 180 and the right U-channel member 186 carries a transfer chain 182. The lower part of the U-channel member 186 connects with a flat plate 190 and which plate on the left end connects with the upper inner part of the leg of the U-channel member 184. In FIGURE 2 it is seen that the flat plate 190 slopes upwardly going from right to left. The U-channel members 184 and 186 are figuratively illustrated as being supported by legs, in phantom. There is a tail shaft 192 having sprockets 194 thereon. The chains wrap around or run around the sprockets 194. There is a head shaft 196 having sprockets 198 thereon. The chains 180 and 182 run around the sprockets 198, Also, on the head shaft 196 is a sprocket 200 which connects with a first grading chain 202.

In FIGURES 1 and 2 it is seen that the second conveyor 10 or slowdown apparatus 10 slopes at a angle downwardly going from right to left. Further, that the upper end of the conveyor belt 112 of the second conveyor 10 is below the ootput side of the conveyor belt 166. Further, the output side of the conveyor belt 112, the left side, is slightly above the transverse chain 182.

On the high speed conveyor 12 or the first conveyor 12, which may move lumber at speeds up to 1000 feet per minute, the lumber coming off the conveyor 12 does not contact the endless belt 112 of the second conveyor 10. The endless belt 112 has a high friction surface. It is seen that on the conveyor 12 that there are pieces of lumber 210 and 212. The piece of lumber 212 is partially on the first conveyor 12 and partially on the third conveyor 14, and, on the third conveyor 14 there is a piece of lumber 216. The lumber 212 on the high speed conveyor 12 initially overrides the endless belt 112 of the slowdown conveyor 10 so that the leading edge 220 is projecting free in space and is not in contact with the endless belt 112 of the second conveyor 10. With the further forward movement of the endless belt 166 the leading edge 220 is in contact with the upper surface of the third conveyor 190 and the trailing edge 222 is in contact with the endless belt, see FIGURES 1 and 2, and the piece of lumber 212 is not in contact with the endless belt 112. Now, with the further forward movement of the belt 166 the piece of lumber 212 moves off of the first conveyor 12. This piece of lumber is now designated 212′ and its leading edge 220′ is over the transfer chain 180 and the trailing edge 222′ is on the endless belt 112. The high friction quality of the endless belt 112 assures the positive positioning of the lumber 212. Since the endless belt 112 is moving at an angle with respect to the endless belt 166 the piece of lumber on the endless belt 112 is moving away from the belt 166 at an angle. This precludes the next succeeding piece of lumber on the endless belt 166 from doubling up or piling up on the next preceding piece of lumber on the endless belt 112. In this manner there is no piling up or doubling up of two pieces of lumber, one on top of the other, on the endless belt 112. A further assistance in this matter is the fact that the endless belt 112 slopes downwardly going away from the first conveyor 12. The piece of lumber on the endless belt 166 then overrides the endless belt 112 and skids along on the upper surface of the plate 190. With the falling of the trailing edge 222 on the endless belt 112 the leading edge 220 of this piece of lumber is not moving longitudinally with the movement of the transfer chains 180 and 182 but is moving laterally with respect to chains as it is skidding across the upper surface of the plate 190. However, the trailing edge of this piece of lumber is moving both laterally with respect to the chains 180 and 182 and is moving longitudinally with respect to the chains 180 and 182. This is so because the continuous belt 112 is moving toward the transfer chains 180 and 182 and since it is at an angle with respect to these transfer chains the trailing edge is likewise moving toward these transfer chains in a lateral manner and in a longitudinal manner. Upon the discharge of the piece of lumber from the second conveyor 10 when the leading edge is over the first transfer chain 180 and the trailing edge is over the second transfer chain 182 the piece of lumber is substantially laterally positioned with these two transfer chains so that this piece of lumber moves in a transverse manner. Again, this is possible because of the movement of the endless belt 112, the high friction qualities on the surface of this endless belt and the fact that the discharge end of the endless belt 112 is positioned slightly above the transfer chain 182 so that lumber moving off the endless belt 112 contacts the upper surface of the plate 190 and can be easily skidded on this plate 190.

The change in movement from a longitudinal movement can be accomplished for variable speed conveyors 12, variable speed slowdown conveyors 10, and for variable speed transverse conveyors 14. Further, the angle the slowdown conveyor 10 makes with the conveyor 12 and the conveyor 14 can be varied, and the degree of inclination can be varied. In essence the speed of operation of the conveyors 10, 12 and 14 and the angle of operation of the conveyor 10 and the angle at inclination of the conveyor 10 can be varied to suit the object being conveyed and the desired speed at which the object is to be conveyed.

From the foregoing it is seen that it is possible to change the direction of travel of an object from a longitudinal direction to a transverse direction. Further, this can readily be done with the output of a high speed conveyor. In addition to transferring the movement of lumber in this manner, it is conceivable that the movement of many other objects can be readily accomplished in this manner. For example, boxes of material may be changed in direction of movement from longitudinal to transverse. Bars, pipes, tubing, and other objetcs can readily be transferred in movement longitudinal to transverse by this apparatus and method.

What I claim is:
1. A longitudinal conveyor, said conveyor comprising:
 (a) a base;
 (b) a rotating table;
 (c) said rotating table connecting with said base;
 (d) a pivot means allowing said rotating table to rotate on the base;
 (e) said table having a conveying means;
 (f) said conveying means sloping so that one end is at a higher elevation than the other end;
 (g) said base comprising a plate;
 (h) a passageway in said plate;
 (i) said passageway being a pivot area;
 (j) three spaced-apart guides in said plate;
 (k) said rotating table having four spaced-apart studs for mating with the passageway and the guides in the plate;
 (l) said plate being sloped downwardly; and
 (m) said table having a conveying means.
2. A longitudinal conveyor, said conveyor comprising:
 (a) a base;
 (b) a rotating table;
 (c) said rotating table connecting with said base;
 (d) a pivot means allowing said rotating table to rotate on the base;
 (e) said table having a conveying means;
 (f) said conveying means sloping so that one end is at a higher elevation than the other end;
 (g) said base comprising a first plate and a second plate;
 (h) said first plate having a passageway and a first guide;
 (i) said second plate having a second guide and a third guide;
 (j) said first and second plates sloping at an angle with respect to the horizontal;
 (k) said rotating table having four spaced-apart studs for mating with the passageway and the guides in the plate; and,
 (l) said table having a conveying means.
3. An apparatus for changing the direction of movement of an object from a longitudinal movement to a transverse movement, said apparatus comprising:
 (a) a first conveyor having a first conveying means for conveying the object in a longitudinal movement;
 (b) a second conveyor having a second conveying means for conveying the object in both a longitudinal and a transverse movement;
 (c) said first conveyor being in a feeding relationship with the second conveyor;
 (d) a third conveyor having a third conveying means for conveying the object in a transverse movement;
 (e) said second conveyor being in a feeding relationship with said third conveyor; and,
 (f) said second conveyor moving at a lesser velocity than the first conveyor.
4. An apparatus according to claim 3 and comprising:
 (a) said second conveyor comprising a base;
 (b) a rotating table;
 (c) said rotating table connecting with said base; and,
 (d) a pivot means allowing said rotating table to rotate on the base.
5. An apparatus according to claim 3 and comprising:
 (a) guide means for guiding the rotational movement of the rotating table; and,
 (b) a driving means for moving the conveyor.
6. An apparatus according to claim 3 and comprising:
 (a) said pivot means comprising a first pivot area on the base;
 (b) a first guide means on said base;
 (c) said pivot means comprising a second pivot area on the rotating table;
 (d) a second guide means on the rotating table;
 (e) said first pivot means and said second pivot means cooperating to position the base and the rotating table with respect to each other; and,
 (f) said first guide means and said second guide means cooperating to position the base and the rotating table.
7. An apparatus according to claim 3 and comprising:
 (a) said base comprising a plate;
 (b) a passageway in said plate;
 (c) said passageway being a pivot area;
 (d) three spaced-apart guides in said plate;
 (e) said rotating table having four spaced-apart studs for mating with the passageway and the guides in the plates;
 (f) said plate being sloped downwardly; and,
 (g) said table having a conveying means.
8. An apparatus according to claim 3 and comprising:
 (a) said base comprising a first plate and a second plate;
 (b) said first plate having a passageway and a first guide;
 (c) said second plate having a second guide and a third guide;
 (d) said first and second plates sloping at an angle with respect to the horizontal;

(e) said rotating table having four spaced-apart studs for mating with the passageway and the guides in the plate; and,
(f) said table having a conveying means.

9. An apparatus according to claim 8 and comprising:
(a) said second conveyor moving at a lesser velocity than the first conveyor.

10. A longitudinal conveyor, said conveyor comprising:
(a) a base;
(b) a rotating table;
(c) said base comprising a plate;
(d) a passageway in said plate;
(e) said passageway being a pivot area;
(f) a guide in said plate;
(g) said rotating table having two spaced-apart studs for mating with the passageway and the guide in the plate; and,
(h) said table having a conveying means.

References Cited
UNITED STATES PATENTS

| | | | |
|---|---|---|---|
| 1,777,048 | 9/1930 | Molins | 198—20 |
| 2,184,905 | 12/1939 | Brintnall | 198—34 |
| 2,525,132 | 10/1950 | Herts | 198—33 |
| 2,848,100 | 8/1958 | Jasper | 198—100 |

EDWARD A. SROKA, Primary Examiner

U.S. Cl. X.R.

198—34, 76, 100